(12) United States Patent
Froese et al.

(10) Patent No.: US 8,950,390 B2
(45) Date of Patent: Feb. 10, 2015

(54) AUXILIARY HEATING DUCT FOR AN INDIRECT FIRED HEATER

(75) Inventors: Rodney A. Froese, Winnipeg (CA); Darren R. Isaac, Winnipeg (CA)

(73) Assignee: Industrial Commercial Equipment Manufacturing Ltd., Winniped, Manitoba (CA)

( * ) Notice: Subject to any disclaimer, the term of this patent is extended or adjusted under 35 U.S.C. 154(b) by 676 days.

(21) Appl. No.: 13/196,241

(22) Filed: Aug. 2, 2011

(65) Prior Publication Data
US 2012/0272945 A1  Nov. 1, 2012

(30) Foreign Application Priority Data
Apr. 26, 2011 (CA) .................................... 2738721

(51) Int. Cl.
*F24H 3/00* (2006.01)
*F23L 15/00* (2006.01)
*F24H 3/06* (2006.01)
*F24D 5/02* (2006.01)
*F24D 15/02* (2006.01)

(52) U.S. Cl.
CPC . *F23L 15/00* (2013.01); *F24H 3/06* (2013.01); *F24D 5/02* (2013.01); *F24D 15/02* (2013.01)
USPC ............... 126/116 R; 126/110 R; 126/104 A; 126/110 B; 126/91 R; 60/39.36

(58) Field of Classification Search
CPC .................... F24H 3/00; F24H 3/02
USPC ..... 126/116 R, 110 R, 104 A, 91 R; 60/39.36
See application file for complete search history.

(56) References Cited

U.S. PATENT DOCUMENTS

| | | | | |
|---|---|---|---|---|
| 3,388,697 A * | 6/1968 | Muckelrath | ............... | 126/110 R |
| 3,969,892 A * | 7/1976 | Stettler et al. | ............... | 60/39.511 |
| 4,002,157 A * | 1/1977 | Toesca | ........................ | 126/110 B |
| 4,309,978 A * | 1/1982 | Hensiek et al. | ........... | 126/110 B |
| 4,471,754 A * | 9/1984 | Galtz | ........................ | 126/110 B |
| 4,729,365 A * | 3/1988 | Mutchler | ................... | 126/110 B |
| 5,065,736 A * | 11/1991 | Mutchler | ................... | 126/110 B |
| 5,363,836 A * | 11/1994 | Briggs | ........................ | 126/109 |
| 5,655,514 A * | 8/1997 | Kowald et al. | ................ | 126/531 |
| 6,186,138 B1 | 2/2001 | Hybertson | | |
| 2007/0101987 A1* | 5/2007 | Atemboski et al. | ........... | 126/518 |

* cited by examiner

*Primary Examiner* — Gregory Huson
*Assistant Examiner* — Nikhil Mashruwala
(74) *Attorney, Agent, or Firm* — Ryan W. Dupuis; Kyle R. Satlerthwaite; Ade & Company Inc.

(57) ABSTRACT

An auxiliary duct is supported on the housing of an indirect fired heater of the type having separate heated air and combustion passages. The auxiliary duct extends between an inlet end at the heated air discharge to an outlet end adjacent a burner assembly at the combustion inlet so as to be arranged to direct a portion of the flow of air heated by the heater towards components of the burner assembly including fuel lines, a fuel pump, a fuel filter and a combustion air intake blower for heating the burner assembly and associated components to improve the operation thereof in colder climates.

16 Claims, 4 Drawing Sheets

US 8,950,390 B2

AUXILIARY HEATING DUCT FOR AN INDIRECT FIRED HEATER

This application claims foreign priority benefits from Canadian Patent Application 2,738,721 filed Apr. 26, 2011.

FIELD OF THE INVENTION

The present invention relates to an auxiliary duct for use with an indirect fired heater comprising separate heated air and combustion passages in which the auxiliary duct is arranged to direct a portion of the heated air towards components of the burner assembly adjacent the inlet end of the combustion passage. The present invention thus relates to a duct for directing heated air towards the burner assembly for heating the burner assembly and related components to improve the operation thereof in colder climates.

BACKGROUND

A common type of portable heater for temporary use, for example at construction sites or remote work sites in the oil and gas industry, is an indirect fired heater. In this instance, the heated air is clean and free of moisture and contaminated fumes so as to be suitable for areas where persons are working.

U.S. Pat. No. 3,388,697 by Muckelrath and U.S. Pat. No. 4,729,365 by Mutchler disclose examples of indirect fired heaters. In each instance a housing of the heater locates separated heated air and combustion passages which are arranged for exchanging heat with one another. A burner assembly is provided including various components such as fuel lines and a combustion air intake blower opposite from a heated air outlet of the housing. In this instance the burner assembly and related components remain substantially unheated. When used in particularly cold climates, the fuel can gel or other problems may arise from the cold temperatures which result in poor performance of the heater.

U.S. Pat. No. 6,186,138 by Hybertson discloses further example of a portable heater in which a duct is arranged to recycle a portion of the heated air back to the heating air inlet to further heat the air. Although the temperature of the heated air can be better controlled, the burner assembly and related components remain substantially unheated which can result in poor performance of the heater in colder climates as described above.

SUMMARY OF THE INVENTION

According to one aspect of the invention there is provided an auxiliary heating duct for use with a portable indirect fired heater, the portable indirect fired heater comprising:
a housing supporting a heating air passage extending from a heating air inlet to a heating air discharge and a combustion passage extending from a combustion inlet to a combustion discharge;
a burner assembly in communication with the combustion passage;
a fuel tank arranged to supply fuel to the burner assembly;
the heating air passage and the combustion passage being separate from one another so as to prevent a flow of combustion gas from the combustion passage from being directed into the heating air passage; and
the heating air passage and the combustion passage being adjacent one another so as to be arranged to exchange heat from the combustion passage to the heating air passage;

the auxiliary heating duct comprising:
an auxiliary passage extending from an inlet end to an outlet end of the duct;
the inlet end of the duct being arranged to be supported adjacent to the heating air discharge so as to be arranged to direct a portion of a flow of heated air from the heating air passage into the auxiliary passage; and
the outlet end of the duct being arranged to be supported adjacent to the burner assembly so as to be arranged to direct said portion of the flow of heated air adjacent to the burner assembly.

According to a second aspect of the present invention there is provided a portable indirect fired heater comprising:
a housing supporting a heating air passage extending from a heating air inlet to a heating air discharge and a combustion passage extending from a combustion inlet to a combustion discharge;
a burner assembly in communication with the combustion passage;
a fuel tank arranged to supply fuel to the burner assembly;
the heating air passage and the combustion passage being separate from one another so as to prevent a flow of combustion gas from the combustion passage from being directed into the heating air passage; and
the heating air passage and the combustion passage being adjacent one another so as to be arranged to exchange heat from the combustion passage to the heating air passage; and
an auxiliary heating duct comprising:
an auxiliary passage extending from an inlet end to an outlet end of the duct;
the inlet end of the duct being supported adjacent to the heating air discharge so as to be arranged to direct a portion of a flow of heated air from the heating air passage into the auxiliary passage; and
the outlet end of the duct being supported adjacent to the burner assembly so as to be arranged to direct said portion of the flow of heated air adjacent to the burner assembly.

The auxiliary heating duct is thus arranged for taking a portion of the heated air from the heated air outlet back to the inlet end of the combustion passage to effectively provide some heat to the fuel lines, the burner assembly and the related components to improve the operation thereof in colder climates. By recycling air from the heated air passage back to the burner assembly, there is no concern for combustion fumes entering the heated air passage even when the heated air inlet is located adjacent the combustion inlet.

Preferably the outlet end of the duct is arranged to direct said portion of the flow of heated air towards the combustion inlet locating a combustion air blower motor and towards adjacent components of the burner assembly including fuel lines, a fuel filter and a fuel pump in communication between the fuel tank and the burner assembly.

When the housing extends in a longitudinal direction between a first end and a second end, and the burner assembly, the combustion inlet and the heating air inlet are located adjacent to the first end of the housing, preferably the outlet end of the duct is arranged to be supported adjacent the first end of the housing.

When the heating air discharge of the heater is located adjacent to the second end of the housing, preferably the inlet end of the duct is arranged to be supported adjacent the second end of the housing.

When the housing has a peripheral wall extending in a longitudinal direction between a first end locating the combustion inlet and an opposing second end locating the heating air discharge, the duct is preferably arranged to extend in the longitudinal direction externally alongside the housing between the inlet end adjacent the second end of the housing and the outlet end adjacent to the first end of the housing. The inlet end of the duct may be arranged to communicate through the peripheral wall of the housing adjacent the second end of the housing.

The outlet end of the duct may be supported externally of the housing so as to be arranged to be directed onto the burner assembly. The outlet end of the duct may further comprise an outlet chamber including chamber walls which are arranged to surround a portion of the burner assembly. Preferably at least a portion of the outlet chamber walls are movable between a working position arranged to surround a portion of the burner assembly and an access position in which access to said portion of the burner assembly is substantially unobstructed by the chamber walls. An outer side wall of the chamber walls may be arranged to be supported substantially flush with the peripheral wall of the housing.

The duct may be arranged to be supported on the housing by threaded fasteners such that the duct can be readily mounted onto an existing heating and is also readily separable from the housing.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
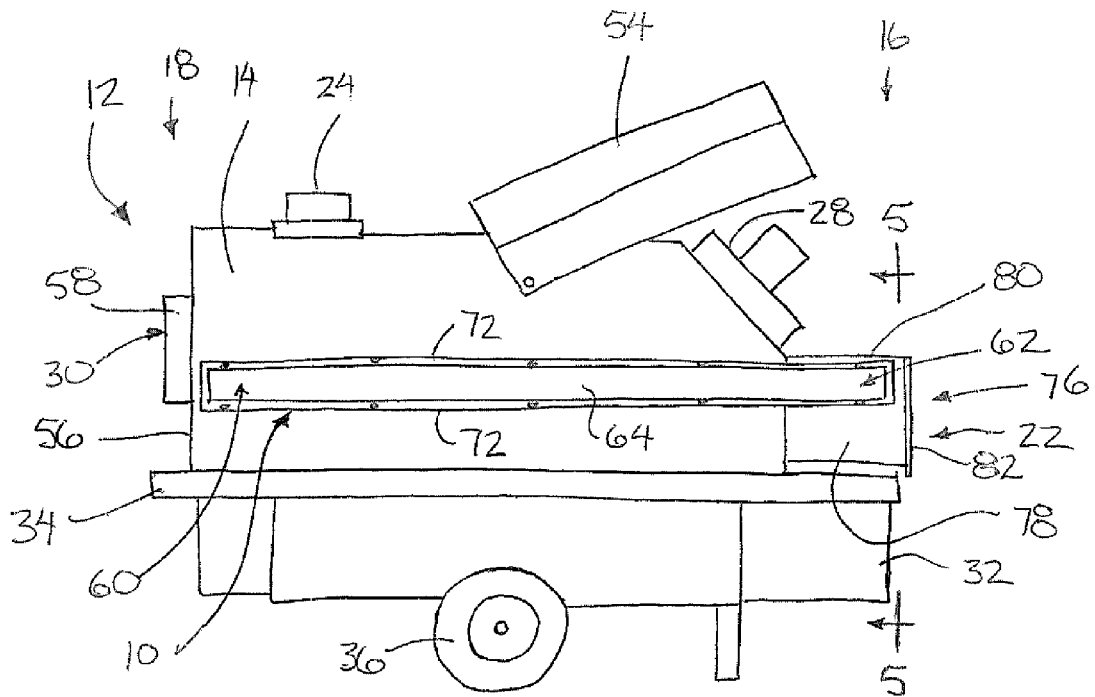
FIG. 1 is a side elevational view of a portable indirect heater including the auxiliary heating duct supported thereon.
Figure 2:
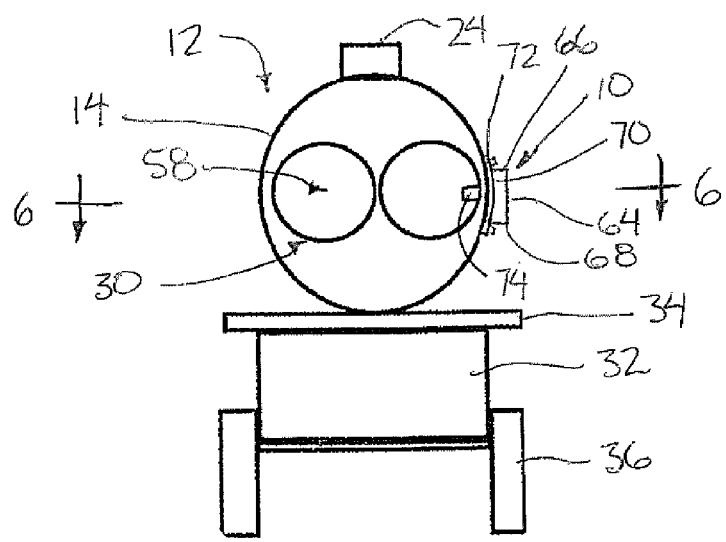
FIG. 2 is an end elevational view of the heater according to FIG. 1.
Figure 3:
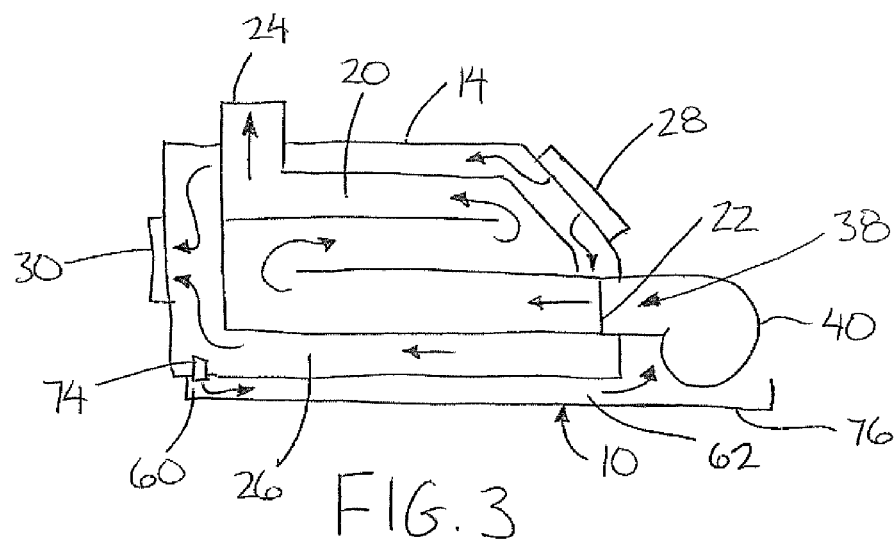
FIG. 3 is a schematic representation of the heating air passage and the combustion passage within the housing of the heater according to FIG. 1.
Figure 4:
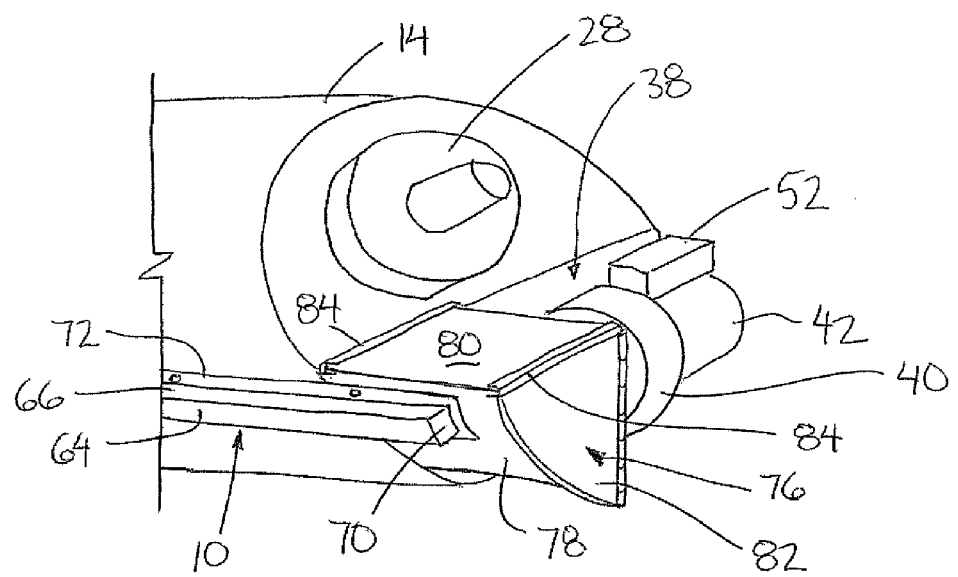
FIG. 4 is a perspective view of the outlet end of the auxiliary heating duct on the heater of FIG. 1.
Figure 5:
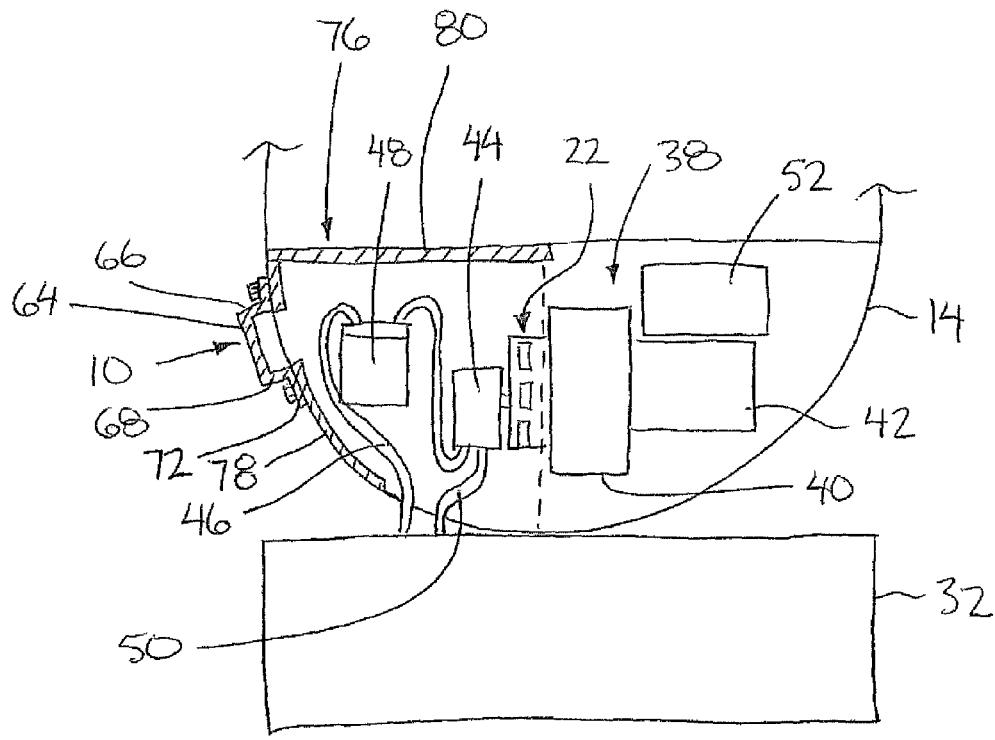
FIG. 5 is a partly sectional end elevational view from the opposing end in relation to FIG. 2, along the line 5-5 of FIG. 1.
Figure 6:
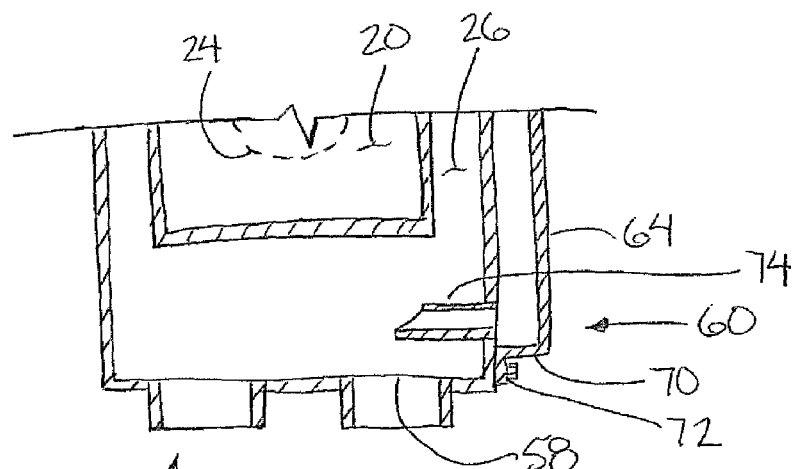
FIG. 6 is a sectional plan view along the line 6-6 of FIG. 2 showing the components at the second end of the housing.
Figure 7:
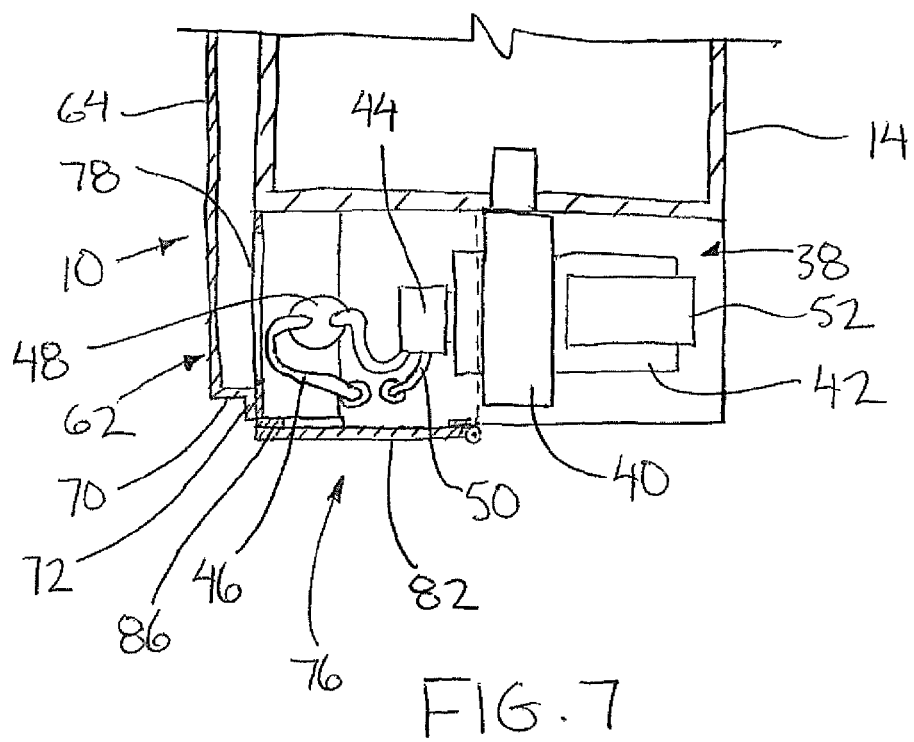
FIG. 7 is a sectional plan view along the line 6-6 of FIG. 2, shown at the first end of the housing.

Referring to the accompanying figures, there is illustrated an auxiliary heating duct generally indicated by reference numeral 10. The duct 10 is particularly suited for use with an indirect fired heater 12 to improve the performance of the burner assembly and related components when used in colder climates.

According to the illustrated embodiment, the duct 10 is suited for a heater of the type comprising a housing 14 having a generally cylindrical peripheral wall which is elongate in the longitudinal direction between a first end 16 and an opposing second end 18 of the heater. The housing locates a combustion passage 20 extending therethrough from an inlet 22 at the first end 16 to an outlet 24 extending upwardly through the top end of the housing adjacent the second end thereof. The housing further locates a heating air passage 26 extending from an inlet end 28 adjacent the first end of the heater to an outlet end 30 adjacent to the second end of the housing similar to the combustion passage. Both passages comprise enclosed passages which remain fully separate from one another to prevent mixing of air therebetween while remaining in close contact by sharing common walls to readily allow the exchange of heat therebetween as in the typical construction of a heat exchanger.

A fuel tank 32 is supported below the housing 14 to extend in the longitudinal direction therewith along the full length of the heater between the opposed first and second ends thereof. A suitable frame 34 supports the housing 14 above the fuel tank 32 which in turn supports the fuel tank on a pair of wheels 36 supported for rolling movement in the longitudinal direction. Additional legs support the housing and fuel tank to be oriented in a generally horizontal orientation when stationary.

The heater includes a burner assembly 38 at the first end of the heater which is supported externally of the housing 14. In particular, the burner assembly includes a combustion air blower 40 having a respective motor 42 to drive the rotation thereof such that the combustion air intake of the blower is externally located in relation to the housing and has an outlet directed into the combustion passage inlet of the housing.

A fuel pump 44 is mounted externally of the housing adjacent the combustion blower to pump fuel from the tank through a fuel supply line 46 having a fuel filter 48 connected in series therewith. A fuel return line 50 is also connected between the fuel pump and the tank to return excess fuel to the tank. The pump 44 acts to pump fuel to an internal burner element at the combustion blower outlet for mixing combustion air with the fuel and igniting the fuel for combusting the fuel and producing heat. The burner assembly further includes an electronic controller 52 mounted externally of the housing at the first end together with the other burner assembly components for controlling the operation of the fuel pump, combustion blower, and igniter of the burner element.

The combustion passage is surrounded by combustion passage walls supported internally within the housing between the combustion inlet and the combustion outlet. The heating air passage 26 in this instance is effectively defined as the space between the combustion passage walls and the surrounding cylindrical wall of the housing 14. An end wall at the first end of the housing encloses the first end of the housing and locates the heating air passage inlet opening therein adjacent the top end of the housing so as to be positioned above the burner assembly and related components. A shield 54 may be mounted externally of the housing to extend upwardly from the top end of the housing at a location between the combustion outlet and the heating air inlet to prevent exhausted combustion gas from being drawn into the heating air inlet. An end wall 56 is similarly located at the second end of the cylindrical peripheral wall of the housing to enclose the opposing end of the housing with the exception of discharge openings 58 located centrally therein which define the heating air passage outlet.

The auxiliary duct 10 defines an auxiliary passage extending from an inlet end 60 adjacent the heating air discharge at the second end of the housing to an outlet end 62 located at the first end of the housing adjacent the burner assembly and the inlets to the combustion and heating air passages. The auxiliary passage defined by the duct effectively extends in a horizontal and longitudinal direction externally alongside the housing from the second end to the first end thereof.

More particularly, the duct comprises an outer side wall 64, a top wall 66 and a bottom wall 68 which extend substantially the full length of the duct in the longitudinal direction and are oriented to define a generally C-shaped profile in relation to one another. Mounting of the duct with the open side thereof against the peripheral wall of the housing permits the peripheral wall of the housing to enclose the open side of the duct such that the duct is fully enclosed between opposing ends thereof. The opposing ends themselves are enclosed by two end walls 70 respectively.

A mounting flange 72 extends about the full periphery of the open side of the duct so as to be joined to an inner edge of the top wall, the bottom wall and both ends walls in perpendicular arrangement therewith for laying flat against the peripheral wall of the housing to which the mounting flange is fastened in use. Fastener apertures located in the mounting flange permit use of threaded fasteners for attaching the duct to the peripheral wall of the housing such that the duct is suitable for mounting onto an existing heater or can be readily removed if no longer required. The full perimeter of the mounting flange lies approximately in a common curved surface following the profile or radius of curvature of the cylindrical outer surface of the housing wall. A suitable gasket of material having a high heat resistance can be secured between the mounting flange of the duct and the outer surface of the peripheral wall of the housing for sealing engagement therebetween.

The inlet end of the duct communicates with an inlet member 74 comprising a tube which extends and communicates through a respective opening in the peripheral wall of the housing spaced longitudinally inward from the end wall of the housing locating the discharge openings 58 therein. The inlet member thus communicates between an interior of the heated air passage adjacent the outlet end thereof and the interior of the inlet end of the auxiliary duct 10. The open end of the tube forming the inlet member is shaped and oriented to face partially rearward from the second end towards the first end of the housing for facing or confronting the exiting air flow from the heated air passage. The flow of exiting air is sufficient to induce a flow of heated air into the inlet member at the inlet end of the duct to induce a flow rearward through the duct back to the outlet end thereof.

The duct further includes an outlet member 76 at the outlet end in the form of chamber walls which surround and define an outlet chamber externally of the housing at the first end thereof. In particular, the outlet member chamber walls include an outer side wall 78 comprising a curved panel which is flush and continuous in the longitudinal direction with the outer surface of the cylindrical peripheral wall of the housing to extend longitudinally outward beyond the end wall at the first end of the housing. The outer side wall is joined at a top end by a top wall 80 extending horizontally and laterally inward from the top edge of the outer side wall over top of the burner assembly but below the heating air inlet such that the top wall directs the heated air exiting the auxiliary duct downward towards the burner assembly and away from the heating air inlet.

The outlet chamber is further enclosed by an end wall 82 joined along an outer side edge to the rear edge of the outer side wall 78 and joined along a top edge to the rear edge of the top wall 80. The end wall 82 is spaced rearward of the housing so as to be spaced outward in the longitudinal direction of the housing beyond the first end thereof. The outlet chamber remains open at the inner side receiving a portion of the burner assembly extending therethrough as well as being partially open at the bottom side to locate some of the fuel lines extending therethrough between the fuel tank therebelow and the burner assembly adjacent the inner side of the outlet chamber.

The outlet chamber communicates with the outlet end of the auxiliary duct by a suitable outlet aperture formed in the outer side wall 78 which is overlapped by the external walls of the duct extending longitudinally along the length of the housing. Accordingly, the induced rearward flow of heated air passes through the opening in the side wall into the interior of the outlet chamber to be subsequently directed downwardly onto the fuel lines, the fuel pump, the fuel filter, and the intake end of the combustion blower of the burner assembly which are all partially or fully surrounded by the walls of the outlet chamber. The horizontally inward top wall above the outlet opening and the downward and inward curvature of the outer side wall from the outlet opening of the duct effectively directs the heated air downwardly and inwardly as desired.

To improve access to the components surrounded by the walls of the housing the top wall 80 may comprise a removable panel which is slidably received in a pair of channels 84 extending horizontally and laterally along opposed front and rear edges of the top wall for slidably receiving the edges of the wall therein. The wall can thus be slidably displaced laterally outward beyond the outer side wall to provide access to the fuel filter, fuel pump and adjacent components from above.

The rear wall 82 may similarly be displaced from a working position partially surrounding the components to be heated to an access position in which the surrounded components are substantially unobstructed by the top and rear walls. In particular the rear wall is coupled along a vertical inner edge thereof to a perimeter frame of the outlet chamber by a suitable hinge such that the rear wall is pivotal about a vertical inner edge thereof between open and closed positions. In the closed position the rear wall overlaps a suitable mounting flange lying in a vertical plane and joined to the top wall and outer side wall respectively. The rear wall overlaps the peripheral flange 86 in the closed position to permit a suitable fastener or lock to be penetrated therethrough for joining the rear wall in fixed position relative to the remaining walls of the outlet chamber as may be desired.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An auxiliary heating duct for use with a portable indirect fired heater,
the portable indirect fired heater comprising:
a housing having an outer peripheral wall extending in a longitudinal direction between a first end and an opposing second end locating a heating air passage therein which extends from a heating air inlet to a heating air discharge at the second end of the housing and a combustion passage extending from a combustion inlet at the first end of the housing to a combustion discharge;
a burner assembly in communication with the combustion passage;
a fuel tank arranged to supply fuel to the burner assembly;
the heating air passage and the combustion passage being separate from one another so as to prevent a flow of combustion gas from the combustion passage from being directed into the heating air passage; and
the heating air passage and the combustion passage being adjacent one another so as to be arranged to exchange heat from the combustion assage to the heating air passage;

the auxiliary heating duct being arranged to extend in the longitudinal direction alongside the housing externally of the outer peripheral wall of the housing, the auxiliary heating duct comprising:
an auxiliary passage extending longitudinally therethrough from an inlet end to an outlet end of the duct;
the inlet end of the duct being arranged to be supported adjacent to the heating air discharge so as to be arranged to direct a portion of a flow of heated air from the heating air passage into the auxiliary passage; and
the outlet end of the duct being arranged to be supported adjacent to the burner assembly so as to be arranged to direct said portion of the flow of heated air adjacent to the burner assembly.

2. The duct according to claim 1 wherein the outlet end of the duct is arranged to direct said portion of the flow of heated air towards the combustion inlet.

3. The duct according to claim 1 wherein the heater includes fuel lines in communication between the fuel tank and the burner assembly, the outlet end of the duct being arranged to direct said portion of the flow of heated air onto said fuel lines.

4. The duct according to claim 1 wherein the heater includes a fuel filter in communication between the fuel tank and the burner assembly, the outlet end of the duct being arranged to direct said portion of the flow of heated air onto said fuel filter.

5. The duct according to claim 1 wherein the burner assembly of the heater includes a fuel pump in communication between the fuel tank and the burner assembly, the outlet end of the duct being arranged to direct said portion of the flow of heated air onto said fuel pump.

6. The duct according to claim 1 wherein the burner assembly of the heater includes a blower motor, the outlet end of the duct being arranged to direct said portion of the flow of heated air towards said blower motor.

7. The duct according to claim 1 in which the housing of the portable indirect fired heater extends in a longitudinal direction between a first end and a second end and in which the burner assembly, the combustion inlet and the heating air inlet are located adjacent to the first end of the housing, wherein the outlet end of the duct is arranged to be supported adjacent the first end of the housing.

8. The duct according to claim 7 wherein the heating air discharge of the heater is located adjacent to the second end of the housing, and wherein the inlet end of the duct is arranged to be supported adjacent the second end of the housing.

9. The duct according to claim 1 wherein the inlet end of the duct is arranged to communicate through the peripheral wall of the housing adjacent the second end of the housing.

10. The duct according to claim 1 wherein the outlet end of the duct is arranged to be directed onto the burner assembly externally of the housing.

11. The duct according to claim 1 wherein there is provided an outlet chamber including chamber walls which are arranged to surround a portion of the burner assembly and wherein the outlet end of the duct communicates with the outlet chamber.

12. The duct according to claim 11 wherein at least a portion of the chamber walls are movable between a working position arranged to surround a portion of the burner assembly and an access position in which access to said portion of the burner assembly is substantially unobstructed by the chamber walls.

13. The duct according to claim 11 wherein an outer side wall of the chamber walls is arranged to be supported substantially flush with the peripheral wall of the housing.

14. The duct according to claim 1 wherein the duct is arranged to be supported on the housing by threaded fasteners such that the duct is readily separable from the housing.

15. A portable indirect fired heater comprising:
a housing supporting a heating air passage extending from a heating air inlet to a heating air discharge and a combustion passage extending from a combustion inlet to a combustion discharge;
a burner assembly in communication with the combustion passage;
a fuel tank arranged to supply fuel to the burner assembly;
fuel lines in communication between the fuel tank and the burner assembly;
the heating air passage and the combustion passage being separate from one another so as to prevent a flow of combustion gas from the combustion passage from being directed into the heating air passage; and
the heating air passage and the combustion passage being adjacent one another so as to be arranged to exchange heat from the combustion passage to the heating air passage; and
an auxiliary heating duct supported on the housing, the auxiliary heating duct comprising:
an auxiliary passage extending from an inlet end to an outlet end of the duct;
the inlet end of the auxiliary heating duct being supported adjacent to the heating air discharge in communication with a flow of heated air from the heating air passage and the inlet end being oriented to receive a portion of said flow of heated air from the heating air passage into the auxiliary passage; and
the outlet end of the auxiliary heating duct being supported adjacent to the burner assembly and the outlet end being directed onto said fuel lines such that said portion of the flow of heated air is directed onto said fuel lines adjacent to the burner assembly.

16. A portable indirect fired heater comprising:
a housing supporting a heating air passage extending from a heating air inlet to a heating air discharge and a combustion passage extending from a combustion inlet to a combustion discharge;
a burner assembly in communication with the combustion passage;
a fuel tank arranged to supply fuel to the burner assembly;
the heating air passage and the combustion passage being separate from one another so as to prevent a flow of combustion gas from the combustion passage from being directed into the heating air passage; and
the heating air passage and the combustion passage being adjacent one another so as to be arranged to exchange heat from the combustion passage to the heating air passage; and
an auxiliary heating duct supported on the housing, the auxiliary heating duct comprising:
an auxiliary passage extending from an inlet end to an outlet end of the duct;
the inlet end of the auxiliary heating duct being supported adjacent to the heating air discharge in communication with a flow of heated air from the heating air passage and the inlet end being oriented to receive a portion of said flow of heated air from the heating air passage into the auxiliary passage; and
the outlet end of the auxiliary heating duct being supported adjacent to the burner assembly in communication with the combustion air inlet and the outlet end being oriented to direct said portion of the flow of heated air into the combustion inlet.

* * * * *